(12) United States Patent
Nakajima

(10) Patent No.: US 6,711,410 B1
(45) Date of Patent: Mar. 23, 2004

(54) BROADCAST COMMUNICATION METHOD, MOBILE COMMUNICATION SYSTEM AND MOBILE STATION USING THE BROADCAST COMMUNICATION METHOD

(75) Inventor: Nobuo Nakajima, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 341 days.

(21) Appl. No.: 09/620,596

(22) Filed: Jul. 20, 2000

(30) Foreign Application Priority Data

Jul. 26, 1999 (JP) .......................................... 11-211375

(51) Int. Cl.$^7$ ................................................. H04B 7/00
(52) U.S. Cl. ..................... 455/500; 455/3.05; 455/3.06; 455/458; 455/502; 455/517; 725/62; 725/64; 725/87; 725/105
(58) Field of Search ............................... 455/3.05, 3.06, 455/458, 500, 502, 517; 725/62, 64, 87, 105

(56) References Cited

U.S. PATENT DOCUMENTS

| | | | | |
|---|---|---|---|---|
| 5,570,389 A | * | 10/1996 | Rossi ........................ | 375/220 |
| 5,701,298 A | * | 12/1997 | Diachina et al. ............ | 370/346 |
| 5,892,759 A | * | 4/1999 | Taketsugu ................... | 370/349 |
| 6,256,509 B1 | * | 7/2001 | Tanaka et al. .............. | 455/515 |
| 6,400,929 B1 | * | 6/2002 | Ue et al. ...................... | 455/69 |
| 2002/0115407 A1 | * | 8/2002 | Thompson et al. ........ | 455/3.01 |

* cited by examiner

Primary Examiner—William Trost
Assistant Examiner—Sharad Rampuria
(74) Attorney, Agent, or Firm—Oblon, Spivak, McClelland, Maier & Neustadt, P.C.

(57) ABSTRACT

A broadcast communication method for a plurality of mobile stations belonging to a group in a mobile communication system is provided, in which a base station network in the mobile communication system sends information on broadcast communication to the plurality of mobile stations at a predetermined time, and a mobile station in the plurality of mobile stations which does not receive the information or broadcast information of the broadcast communication inquires of the base station network about the broadcast communication.

19 Claims, 4 Drawing Sheets

BROADCAST COMMUNICATION METHOD, MOBILE COMMUNICATION SYSTEM AND MOBILE STATION USING THE BROADCAST COMMUNICATION METHOD

BACKGROUND OF THE INVENTION

1. Field of the Invention

The present invention relates to a broadcast communication method in a mobile communication system, a mobile communication system and a mobile station using the broadcast communication method.

2. Description of the Related Art

Conventional broadcast communication methods can be divided broadly into two kinds. The first method is a method in which it is insured perfectly that mobile stations receive broadcast information. According to the first method, every mobile station which is an object for broadcast communication sends ACK (acknowledgment) to a base station network every time the mobile station receives broadcast information. The base station network resends the broadcast information to a mobile station, if the mobile station does not send ACK. Examples which use this method are a broadcast service of a two way pager and the like. The base station network means a mobile communication system except for mobile stations in this specification.

The second method is a method in which it is not insured that mobile stations receive broadcast information. According to the second method, the base station network only sends broadcast information to mobile stations and any mobile station does not reply to the base station network. An example which uses this method is a broadcast service of a general pager.

According to the above-mentioned first method, the mobile stations can receive broadcast information almost perfectly. Thus, reliability is high. However, there is a problem that transmission efficiency is lowered since replies from mobile stations are concentrated. In addition, even when communication state is good, the base station network should prepare for receiving replies from all mobile stations. Thus, the mobile communication system operates inefficiently since the base station network must use unnecessary frequency resources. These problems become outstanding as the number of mobile stations increases.

According to the second method, there is no problem as to efficiency since the base station network only sends information. However, reliability is low since it is not possible to check whether a mobile station receives the information.

SUMMARY OF THE INVENTION

It is an object of the present invention to provide an efficient and reliable broadcast communication method in a mobile communication system.

The above object of the present invention is achieved by a broadcast communication method for a plurality of mobile stations belonging to a certain group in a mobile communication system, the broadcast communication method comprising the steps of:

a base station network in the mobile communication system sending information on broadcast communication to the plurality of mobile stations at a predetermined time; and a mobile station in the plurality of mobile stations which does not receive the information or broadcast information of the broadcast communication inquiring of the base station network about the broadcast communication.

In the above-mentioned method, the information on the broadcast communication may include the time for performing the broadcast communication and a number indicating the group.

In the above-mentioned method, the base station network may perform the broadcast communication a plurality of times, and may send information which indicates that the base station network performed the broadcast communication to the group at a predetermined time after the broadcast communication.

The above object of the present invention is also achieved by a mobile communication system which performs broadcast communication for a plurality of mobile stations belonging to a group, the mobile communication system comprising:

a base station network including a part which sends information on broadcast communication to the plurality of mobile stations at a predetermined time;

a mobile station including a part which receives the information and receives broadcast information of the broadcast communication on the basis of the information; and wherein the mobile station inquires of the base station network about the broadcast communication when the mobile station does not receive the information or the broadcast information.

In the above-mentioned system, the base station network may further include a part which performs the broadcast communication a plurality of times.

In addition, in the above-mentioned system, the base station network may further include a part which sends information which indicates that the base station network performed the broadcast communication to the group at a predetermined time after the broadcast communication.

The above object of the present invention is also achieved by a mobile station in a mobile communication system which performs broadcast communication, the mobile station comprising:

a part which receives information on the broadcast communication and receives broadcast information of the broadcast communication on the basis of the information;

a part which inquires of a base station network in the mobile communication system about the broadcast communication when the mobile station does not receive the information or the broadcast information.

In the above-mentioned mobile station, the information on the broadcast communication may include the time for performing the broadcast communication and a number indicating the group to which the mobile station belongs.

According to the above-mentioned invention, the base station network sends information such as the program table to the mobile station beforehand and the mobile station requests the broadcast information only when the mobile station did not receive the broadcast information. Therefore, transmission efficiency is not lowered in contrast to the conventional technique in which transmission efficiency is lowered due to ACK concentration. In addition, even when the mobile station could not receive the broadcast information, the mobile station can send a request for resending the broadcast information by receiving and checking information on broadcast communication such as the program table. Therefore, the mobile station can receive the broadcast information reliably. Thus, reliability increases.

In addition, according to the present invention, since the broadcast information may be sent a plurality of times, reliability is further improved.

Further, according to the present invention, when the mobile station could not receive the program table and the broadcast information, the mobile station can request the broadcast information since the base station network sends, at a predetermined time, information indicating that the broadcast information was sent. Therefore, reliability is further improved.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, an embodiment of the present invention will be described with reference to figures.

Figure 1:
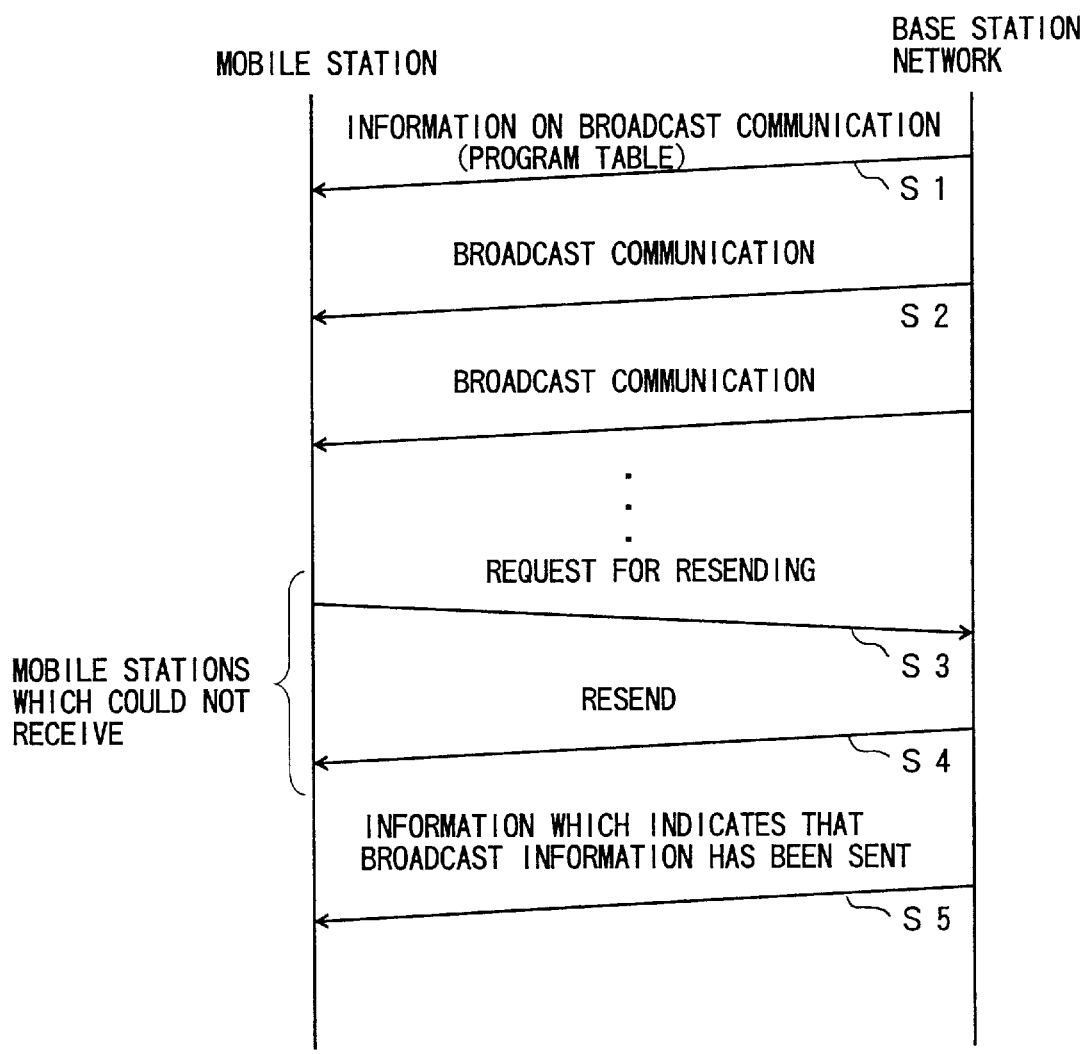
FIG. 1 is a sequence chart showing a data sending and receiving sequence according to the present invention.

FIG. 1 is a sequence chart showing an example of data sending and receiving sequence in the broadcast communication method according to the present invention.

In step 1, the base station network sends information (a program table) including the time when broadcast communication is performed, a group number and the like to a plurality of mobile stations of the group which are objects for the broadcast communication. The information is sent once or a plurality of times at a predetermined time. The predetermined time may be different for each group. Accordingly, the mobile stations can prepare for receiving broadcast information such that reliability for receiving broadcast information improves.

In step 2, the base station network performs broadcast communication on the basis of the program table which is already sent to the mobile stations. As shown in FIG. 1, broadcast communication may be performed a plurality of times to improve reliability. After that, the mobile stations which can receive broadcast information do not send any information to the base station network. The mobile stations which can not receive broadcast information send a request for resending the broadcast information in step 3. After receiving the request, the base station network resends the broadcast information in step 4. Since it can be anticipated that a large part of the mobile stations can receive the broadcast information as scheduled, the number of the request sent by the mobile stations which can not receive the broadcast information is small. Thus, transmission efficiency is not lowered. The request for resending the broadcast information can be performed, for example, at a time when traffic is small after broadcast communication is performed.

In step 5, the base station network can send information which indicates that it has performed the broadcast communication to the mobile stations in the corresponding group once or a plurality of times. The information is sent, for example, at a predetermined time or when traffic is small. By receiving the information, mobile stations which could not receive the program table and the broadcast information can recognize that the broadcast communication was performed. Then, the mobile stations can receive the broadcast information by sending request for resending the broadcast information to the base station network. Accordingly, reliability is further improved. The information can be sent with the program table shown in step 1. For example, the program table may include a plurality of programs and may have flags for programs which have been sent.

Figure 2:
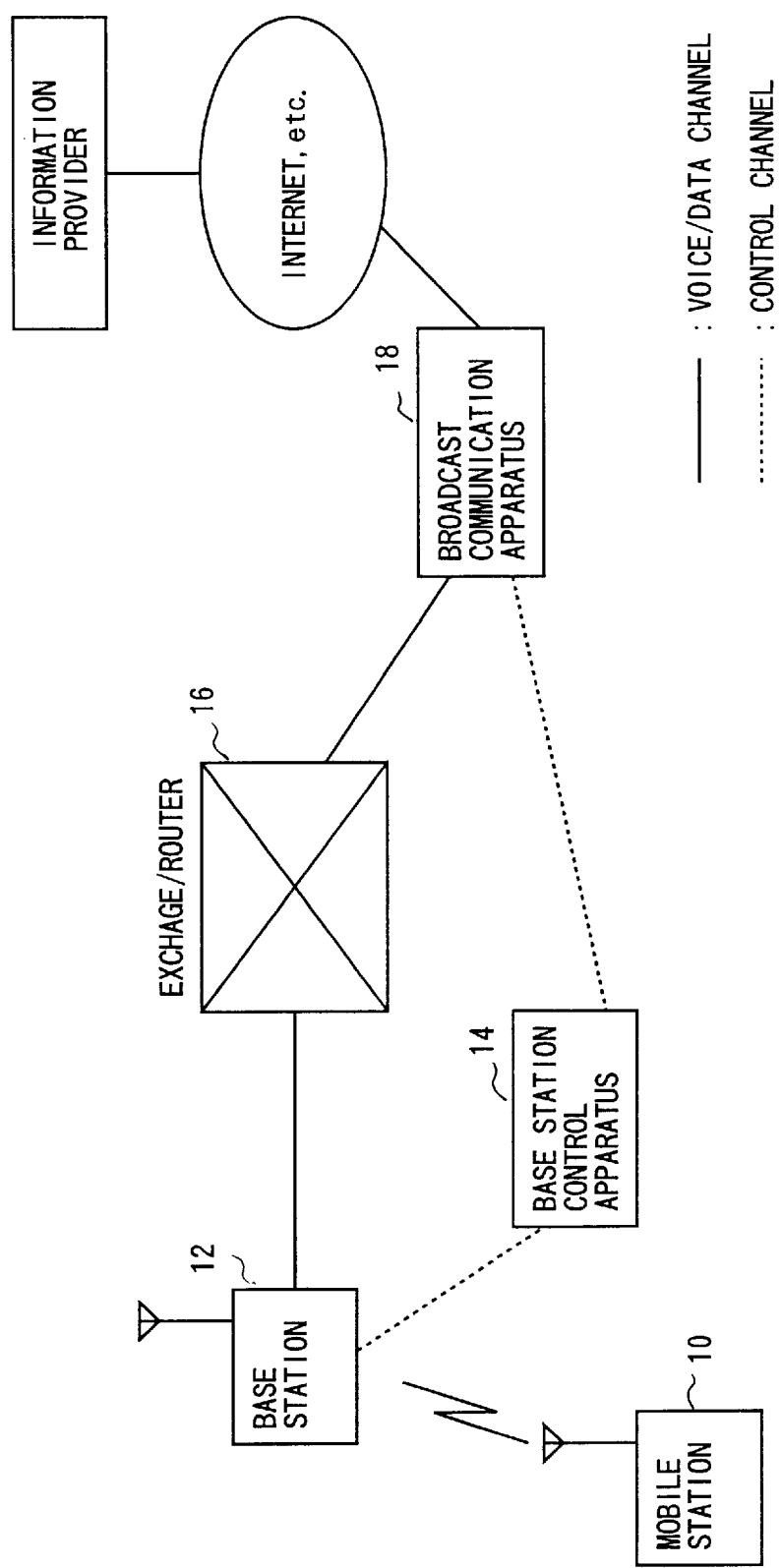
FIG. 2 is a block diagram of a mobile communication system example according to the present invention.

FIG. 2 is a block diagram of a mobile communication system example according to the present invention. As shown in the figure, the mobile communication system includes a mobile station 10 which receives broadcast information, a base station 12 which sends the broadcast information to the mobile station by wireless communication, a base station control apparatus 14 which controls wireless channels for broadcast communication, an exchange or a router 16 which sends broadcast information to a destination base station, and a broadcast communication apparatus 18 which sends the broadcast information, performs resending the broadcast information and the like. The base station network in this specification corresponds to the base station 12, the base station control apparatus 14, the switch or the router 16 and the broadcast communication apparatus 18.

The broadcast communication apparatus 18 includes, for example, a part for storing and sending the broadcast information, and a part for controlling broadcast communication. In addition, the broadcast communication apparatus 18 can store and send information from an information provider which connects to the Internet and the like as shown in FIG. 2.

The broadcast communication apparatus 18 is connected to the exchange or the router 16 via a voice/data channel. The exchange or the router 16 sends the broadcast information received from the broadcast communication apparatus 18 to the base station 12. A plurality of base stations may be connected to the exchange or the router 16. In addition, the broadcast communication apparatus 18 is connected to the base station control apparatus 14 via a control channel, and sends wireless channel control information to the base station control apparatus 14. The base station control apparatus 14 sends control information based on the wireless channel control information to the base station 12 such that the base station 12 controls wireless channels.

Figure 3:
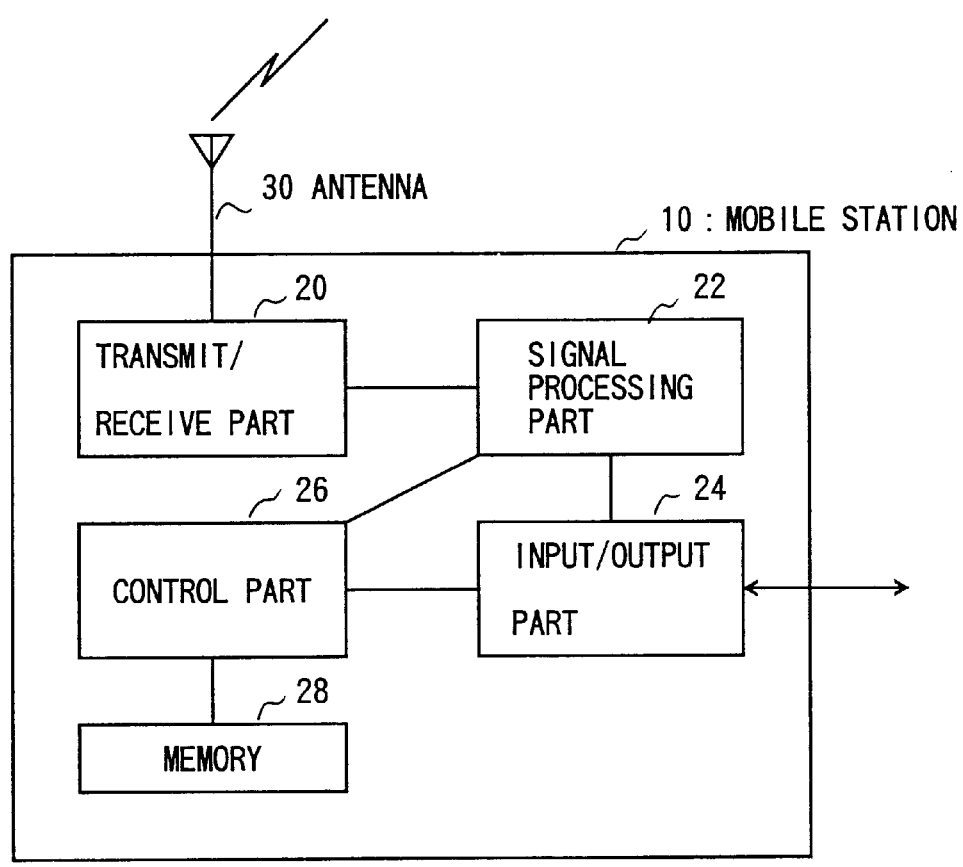
FIG. 3 is a schematic block diagram showing a configuration example of a mobile station.

FIG. 3 is a schematic block diagram showing a configuration example of the mobile station 10. As shown in FIG. 3, the mobile station 10 includes a transmit/receive part 20 which transmits and receives a signal to the base station, a signal processing part 22 which performs various signal processing such as coding/decoding, modulating/demodulating and the like, an input/output part 24 which performs voice output, displaying information, keypad input, voice input and the like, a control part 26 which controls for receiving broadcast information, a memory 28 which stores a control program, voice data and other data, and an antenna 30. In addition, a power supply and the like, which is not shown in the figure, is included. The program stored in the memory 28 is executed by the control part 26 for performing broadcast communication.

Figure 4:
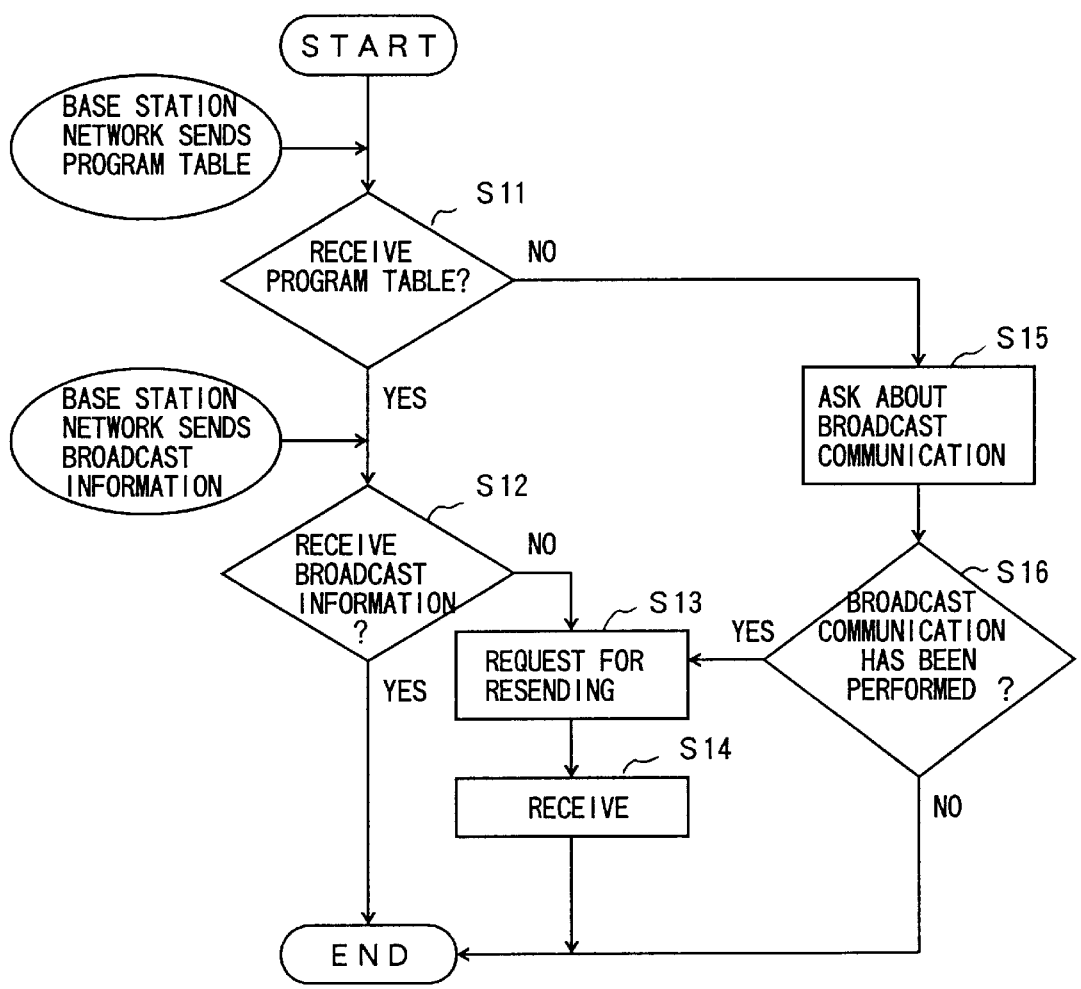
FIG. 4 is a flowchart showing an operation example of the mobile station.

FIG. 4 is a flowchart showing an operation example of the mobile station 10. The operation will be described with reference to FIG. 4 in the following.

When the base station network sends the program table to the mobile station and the mobile station receives the program table (when Yes in step 11), the mobile station prepares for receiving broadcast information. When the base station network sends the broadcast information and the mobile station receives the broadcast information (when Yes in step 12), the process for this broadcast communication ends.

When the mobile station receives the program table but does not receive the broadcast information (when No in step 12), the mobile station sends a request for resending the broadcast information to the base station network in step 13, receives the requested broadcast information in step 14, and then, the process ends.

When the mobile station does not receive the program table (when No in step 11), the mobile station asks the base station network whether the broadcast information has been sent in step 15. If the mobile station recognizes that the broadcast information has been sent in step 16, the mobile station sends a request for resending the broadcast information in step 13, receives the broadcast information, and then, the process ends. If the mobile station recognizes that the broadcast information has not been sent, the process ends.

As mentioned above, according to the present invention, the base station network sends information such as the program table to the mobile station beforehand and the mobile station requests the broadcast information only when the mobile station does not receive the broadcast information. Therefore, transmission efficiency is not lowered. In addition, even when the mobile station could not receive the broadcast information, the mobile station can send a request for resending the broadcast information by receiving and checking information on broadcast communication such as the program table. Therefore, the mobile station can receive the broadcast information reliably. Thus, reliability increases.

In addition, according to the present invention, since the broadcast information may be sent a plurality of times, reliability is further improved.

Further, according to the present invention, when the mobile station could not receive the program table and the broadcast information, the mobile station can request the broadcast information since the base station network sends, at a predetermined time, information indicating that the broadcast information was sent. Therefore, reliability is further improved. Further, since the base station network can send the information indicating the broadcast information was sent at a time when traffic is small, resources can be used effectively and efficiency is further improved in addition to improved reliability.

Therefore, according to the present invention, the efficient and reliable broadcast communication method can be provided.

The present invention is not limited to the specifically disclosed embodiments, and variations and modifications may be made without departing from the scope of the invention.

What is claimed is:

1. A broadcast communication method for a plurality of mobile stations belonging to a group in a mobile communication system, said broadcast communication method comprising:
   sending by a base station network in said mobile communication system information on broadcast communication to said plurality of mobile stations at a predetermined time; and
   inquiring by a mobile station in said plurality of mobile stations of said base station network about said broadcast communication when the mobile station does not receive said information or broadcast information of said broadcast communication,
   wherein said information on said broadcast communication includes a time for performing said broadcast communication and an identifier indicating said group.

2. The broadcast communication method as claimed in claim 1, wherein said information on said broadcast communication includes a program table including the time for performing said broadcast communication.

3. The broadcast communication method as claimed in claim 1, wherein said base station network performs said broadcast communication a plurality of times at said predetermined time.

4. The broadcast communication method as claimed in claim 1, wherein said base station network sends notifying information which indicates that said base station network performed said broadcast communication to said group at a predetermined time after said broadcast communication.

5. A mobile communication system which performs broadcast communication for a plurality of mobile stations belonging to a group, said mobile communication system comprising:
   a base station network including means for sending information on broadcast communication to said plurality of mobile stations at a predetermined time; and
   a mobile station including means for receiving said information and receives broadcast information of said broadcast communication on the basis of said information,
   wherein said mobile station inquires of said base station network about said broadcast communication when said mobile station does not receive said information or said broadcast information, and
   wherein said information on said broadcast communication includes a time for performing said broadcast communication and an identifier indicating said group.

6. The mobile communication system as claimed in claim 5, wherein said information on said broadcast communication includes a program table including the time for performing said broadcast communication.

7. The mobile communication system as claimed in claim 5, wherein said base station network further includes means for performing said broadcast communication a plurality of times at said predetermined time.

8. The mobile communication system as claimed in claim 5, wherein said base station network further includes means for sending notifying information which indicates that said base station network performed said broadcast communication to said group at a predetermined time after said broadcast communication.

9. A mobile station in a mobile communication system which performs broadcast communication, said mobile station comprising:
   means for receiving information on said broadcast communication and for receiving broadcast information of said broadcast communication on the basis of said information; and
   means for inquiring of a base station network in said mobile communication system about said broadcast communication when said mobile station does not receive said information or said broadcast information,
   wherein said information on said broadcast communication includes a time for performing said broadcast communication and an identifier indicating said group.

10. The mobile station as claimed in claim 9, wherein said information on said broadcast communication includes a program table including the time for performing said broadcast communication.

11. The broadcast communication method as claimed in claim 4, wherein said notifying information includes a program table that includes a plurality of programs and flags indicating programs which have been sent to said group by broadcast communication.

12. The broadcast communication system as claimed in claim 8, wherein said notifying information includes a program table that includes a plurality of programs and flags indicating programs which have been sent to said group by broadcast communication.

13. A mobile communication system which performs broadcast communication for a plurality of mobile stations belonging to a group, said mobile communication system comprising:

a base station network configured to send information on broadcast communication to said plurality of mobile stations at a predetermined time; and a mobile station configured to receive said information and receive broadcast information of said broadcast communication on the basis of said information, wherein said mobile station inquires of said base station network about said broadcast communication when said mobile station does not receive said information or said broadcast information, and wherein said information on said broadcast communication includes a time for performing said broadcast communication and an identifier indicating said group.

14. The mobile communication system as claimed in claim 13, wherein said information on said broadcast communication includes a program table including the time for performing said broadcast communication.

15. The mobile communication system as claimed in claim 13, wherein said base station network performs said broadcast communication a plurality of times at said predetermined time.

16. The mobile communication system as claimed in claim 13, wherein said base station network sends notifying information which indicates that said base station network performed said broadcast communication to said group at a predetermined time after said broadcast communication.

17. The mobile communication system as claimed in claim 16, wherein said notifying information includes a program table that includes a plurality of programs and flags indicating programs which have been sent to said group by broadcast communication.

18. A mobile station in a mobile communication system which performs broadcast communication, said mobile station comprising:

a receiver configured to receive information on said broadcast communication and to receive broadcast information of said broadcast communication on the basis of said information; and a unit configured to inquire of a base station network in said mobile communication system about said broadcast communication when said mobile station does not receive said information or said broadcast information, wherein said information on said broadcast communication includes a time for performing said broadcast communication and an identifier indicating said group.

19. The mobile station as claimed in claim 18, wherein said information on said broadcast communication includes a program table including the time for performing said broadcast communication.

* * * * *